Oct. 16, 1956        S. F. PARHAM        2,766,809
METHOD AND APPARATUS FOR HEAT SEALING
Filed June 14, 1950        2 Sheets-Sheet 1
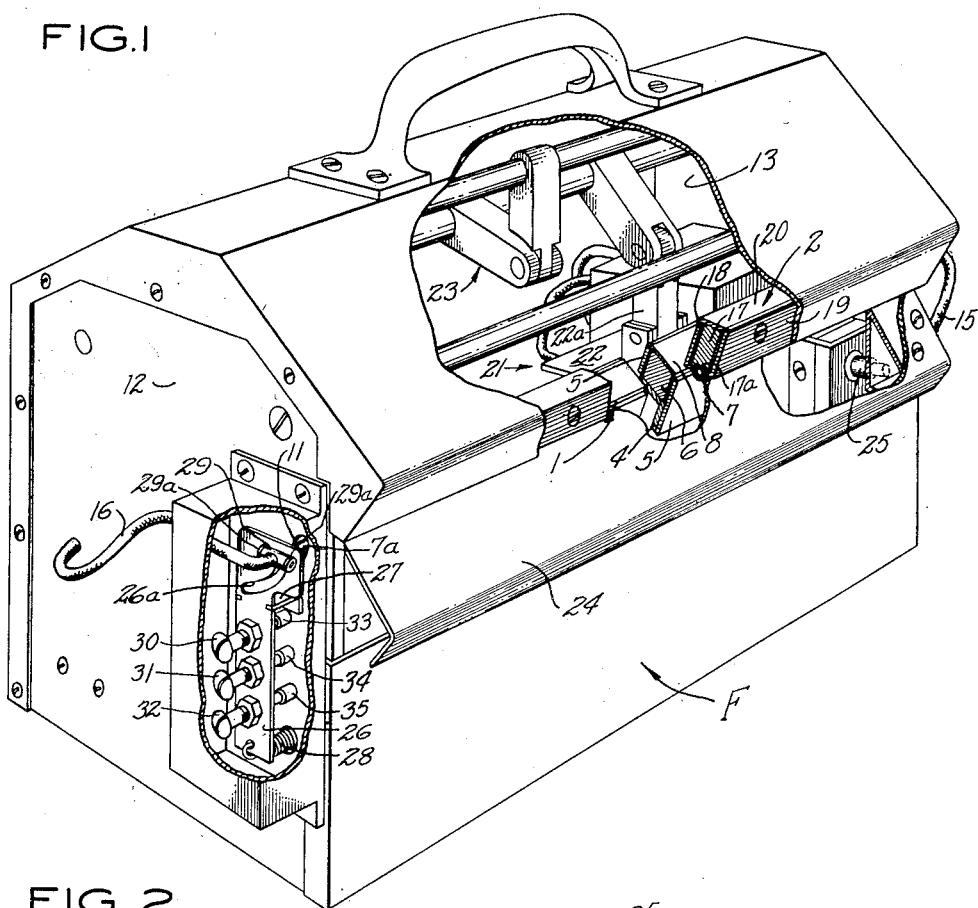
INVENTOR
SIDNEY F. PARHAM
BY Parham & Bates
ATTORNEYS Oct. 16, 1956 S. F. PARHAM 2,766,809
METHOD AND APPARATUS FOR HEAT SEALING
Filed June 14, 1950 2 Sheets-Sheet 2
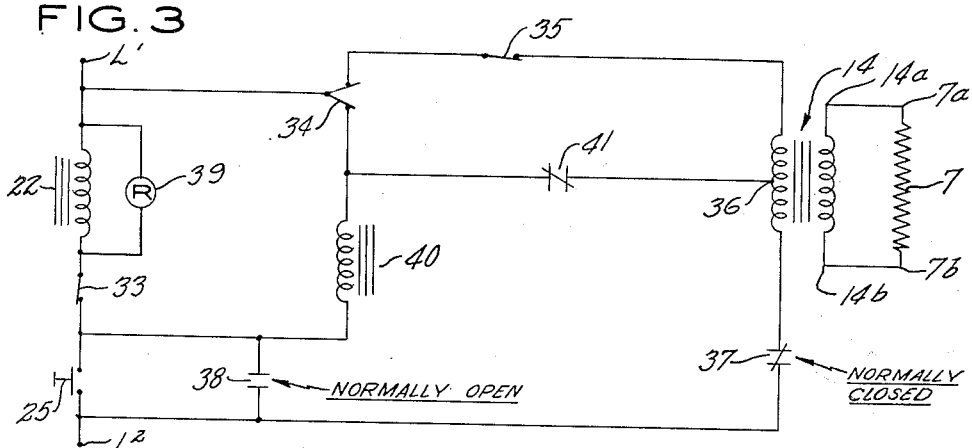
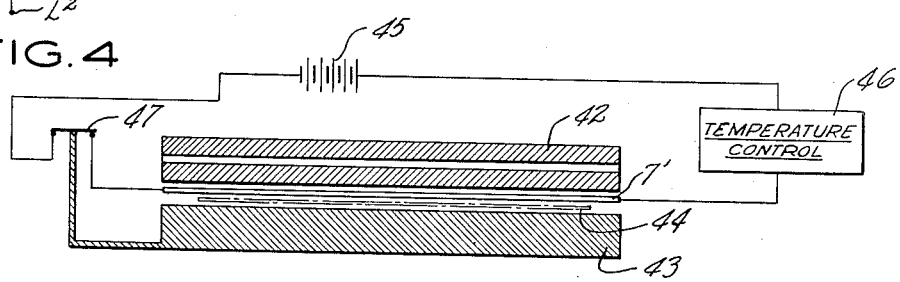
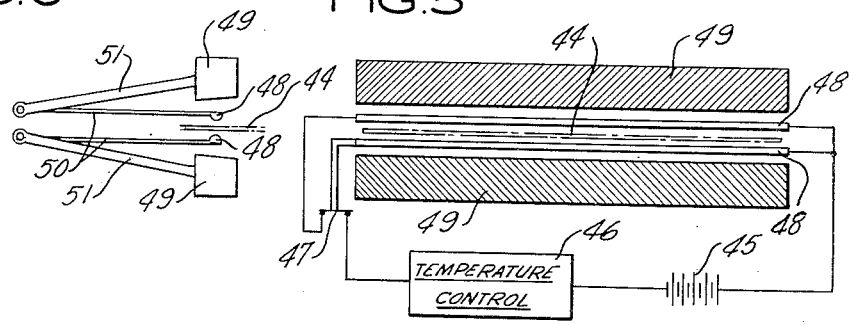
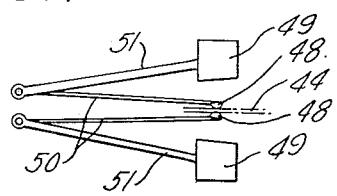
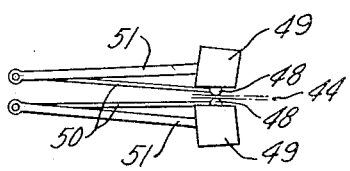
INVENTOR
SIDNEY F. PARHAM
BY Parham & Bates
ATTORNEYS United States Patent Office 2,766,809
Patented Oct. 16, 1956

2,766,809

METHOD AND APPARATUS FOR HEAT SEALING

Sidney F. Parham, Hartford, Conn., assignor to Emhart Manufacturing Company, a corporation of Delaware Application June 14, 1950, Serial No. 168,000

12 Claims. (Cl. 154—42)

The present invention relates to novel method and apparatus for heat sealing film and sheet formed of materials such as polyethylene which are difficult to heat seal.

In order to seal two or more layers of thermoplastic film, they may be pressed together between clamping jaws, one or both of which may be provided with heating elements to soften and fuse together the clamped film. Thereafter, the sealing pressure may be relieved and the sealed film removed.

Frequently it is desirable that the sealing pressure be maintained until the hot plastic of the seal has been cooled and set so that it does not tear apart if the film tends to stick to the sealing elements or otherwise tends to separate when the sealing pressure is relieved and the jaws opened.

It will be understood that, other factors being equal, the less time a heat sealer requires to effect a seal the more acceptable it will be commercially. Therefore, it is important that the heating time and the cooling time be as small as possible and for that reason both rapid heating and forced cooling are desirable.

The pending patent application of Edward Boyd Gardner, Serial No. 127,718, filed November 16, 1949, now U. S. 2,719,567, discloses a thermoplastic heat sealer having a tubular heating element, the heating of which is initiated immediately upon closing of the clamping jaws. Fluids may be passed through the tubular element with a view to promoting rapid cooling after the sealing temperature has been attained.

The pending patent application of Robert H. Park, Serial No. 154,112, filed April 5, 1950, discloses a heat sealing device having a novel fluid cooled heating element.

It is a general object of the present invention to provide an improved method and apparatus for heat sealing thermoplastic resin films more expeditiously than heretofore.

More particularly, it is an object to provide a sealer in which the heating of one or more sealing elements is initiated prior to the closing of the clamping jaws and in which the heating elements are force cooled immediately upon completion of sealing fusion.

The heating of the sealing element or elements may be initiated by any suitable means and at any effective rate, for example, the heating may be first at an optimum rapid rate prior to closing of the sealing jaws and maintained at a desired sealing temperature at a lesser heating rate until the sealing jaws are closed and sealing of the thermoplastic is effected.

In accordance with the invention, heating of the sealing element may be stopped upon closing of the jaws or at a preselected later time. In both cases sufficient heat must be supplied by the heating element or elements to raise the contacting thermoplastic surfaces to a heat sealing or fusion temperature.

A further object of the invention is to provide a sealer in which cooling of the heating element is initiated at a time such that the temperature of the contacting thermoplastic is lowered promptly upon reaching fusion temperature. As an example, the application of a coolant to one portion of the heating element may begin before fusion of the plastic is effected and while heat from another portion of the element adjacent the thermoplastic film continues to raise the contacting surfaces of the film to the sealing temperature. Thereafter, the element is entirely cooled below the plastic fusion temperature by the coolant, so that the direction of heat transfer is reversed and heat from the fused film is dissipated back through the element to the coolant and the seal is set.

A further object is to provide a novel heat sealing method and apparatus wherein thermoplastic film is heated by contact or other heat transferring association with one or more low heat capacity heating elements and sealing pressure subsequently is exerted on the film by clamping and cooling members which have a high heat capacity and rapidly chill the heating elements by conduction or other form of heat transfer prior to relieving the sealing pressure.

Another object is to provide a heat sealing apparatus of the type indicated which includes one or more heating elements movable into and out of heating positions and one or more clamping members movable into and out of clamping position relative to the film and into and out of cooling contact with the heating elements.

Other objects and advantages of the invention are pointed out or will be apparent from the several embodiments of the invention hereinafter described with reference to the accompanying drawing in which:

Figure 1 is a perspective view partially broken away of heat sealing apparatus embodying the invention;

Fig. 2 is a wiring diagram of a heating and cooling circuit for the apparatus shown in Fig. 1;

Fig. 3 shows a modification of the circuit illustrated in Fig. 2;

Fig. 4 is a schematic view of clamping jaws and heating element together with heat controls which constitute a somewhat different embodiment of the invention;

Fig. 5 is a schematic front elevation view of a modification of the apparatus of Fig. 4; and Figs. 6, 7 and 8, respectively, are side elevations showing three positions in the operation of the apparatus illustrated in Fig. 5.

Referring to Fig. 1, the heat sealer there shown is generally similar to that illustrated and described in the aforementioned application of Gardner and in addition to a suitable frame and housing F includes a pair of clamping jaws 1 and 2 which are shown in their open position and which may be moved relative to one another into and out of pressing engagement with two or more interposed layers of thermoplastic film that are to be heat sealed. In the illustrated embodiment, it is contemplated that the jaw 2 may be moved out of clamping engagement with jaw 1 which is stationary, although it will be understood that either or both of the jaws may be movable between open and closed positions.

More particularly, the jaw 1 comprises a length of angle iron 4 which may be rigidly secured at its ends to the housing F. Mounted on the outer surface of the member 4, as by means of angle iron members 5, is a resilient member 6 that is resistant to heat deterioration and over which a Teflon sheet or covering 8 is secured by the members 5 to prevent sticking of the film to the jaw 1 when the film is heated between the closed jaws to a bonding or fusion temperature by a heating element 7 carried by the movable jaw 2.

In the embodiment illustrated, the heating element 7 is an elongated tubular member having an outer shell formed of a material, such as steel, which offers resistance to flow of electrical energy. Secured to the inner surface of the metal shell is a layer of enamel or other material which may be readily and strongly bonded to the shell and which is a thermal insulation having a suitably low coefficient of heat transfer. The element 7 is somewhat longer than the jaw 2 on which it is mounted and one end 7a extends in non-contacting relation through an arcuately slotted aperture 11 in side 12 of the housing F which permits unobstructed opening and closing movement of the jaw 2 and the element 7.

The metal shell of the element 7 is connected adjacent its ends across a source of electric current as, for example, secondary terminals 14a and 14b of a transformer 14 (Figs. 2 and 3) and can be heated to a selected temperature by suitable control of the current supplied to the primary of the transformer.

Water or other fluid coolant may be passed through the insulating lining of the element 7 by means of supply and exhaust line connections 15 and 16, respectively, to rapidly chill the element 7.

The details of the jaw 2 and its operating mechanism may vary widely. The jaw 2 illustrated in Fig. 1, which is movable into and out of clamping engagement with the fixed jaw 1, includes a length 17 of rubber or other resilient material of rectangular cross-section on which the element 7 is mounted. The element 7 and surface 17a of member 17 are covered by a Teflon sheet 18, which with member 17 is secured by a plate 19 to an angle-iron support 20 that is operably carried by jaw-actuating mechanism generally designated 21. The latter includes a clamping solenoid 22 which is located in the housing F and has a vertically movable plunger 22a which, through suitable linkage generally designated 23, may drop of its own weight or with the assistance of a spring (not shown) to raise jaw 2 to its upper or open position (Fig. 1) when the solenoid 22 is not energized. When the solenoid 22 is energized, as by pressing bar 24 to close switch 25, the linkage 23 clamps the jaw 2 against the jaw 1 and holds it in closed position under sufficient pressure to seal plastic film heated by the element 7.

For a more specific disclosure of the linkage 23 for operating jaw 2, reference may be made to the aforementioned patent application of Gardner, although it will be understood that no specific mechanism is necessary to an understanding and practice of the invention.

In accordance with the invention, provision is made for heating the element 7 prior to closing the jaws 1 and 2 and for adjustably preselecting the temperatures to which the element 7 is heated and cooled, as well as for automatically opening the jaws 1 and 2 when the element 7 has cooled to the preselected lower temperature at which the sealed plastic is set.

Moreover, provision may be made for initially heating the element 7 at a rapid rate to or near the selected sealing temperature and for establishing and maintaining that temperature thermostatically at a lesser heating rate.

In the embodiment shown in Fig. 1, the free end 7a of the heating element 7 passes through the upper end of a vertically disposed multiplying lever 26 which is fulcrumed adjacent its upper end on the outer edge of a bracket 27 is fastened to the side 12 of the housing F. The lever 26 is secured on its fulcrum 27 by means of a tension spring 28, the ends of which are secured to a fixed bracket (not shown) mounted on the inner wall 12 of the frame and to the lower end of the lever 26, and by means of a stop 29 which is adjustably mounted on the end 7a of heating element 7 and against which the upper end of the lever 26 is forced by the spring 28.

The lever 26 and fulcrum 27 preferably are formed of brass or other conductor of electricity so that they may serve in part to connect end 7a of the element 7 with transformer terminal 14a (Figs. 2 and 3).

The lever 26 may be arcuately slotted as at 26a and the stop 29 provided with end rollers 29a located at opposite sides of the slot 26a so as to permit ready movement of the element 7 and its stop 29 relative to the lever 26 when the jaw 2 moves to its open and closed positions.

It will be understood that the heating element 7 expands and contracts in length responsively to the increases and decreases in its temperature, and, inasmuch as end 7b (Figs. 2 and 3) of the element 7 is securedly fastened relative to the jaw member 2, movement of the free end 7a produced by heating and cooling of the element result in a corresponding thermostatic movement of the lever 26. The element 7 is, of course, suitably secured against other than the movement relative to the jaw 2 that is effected by expansion and contraction due to change in its temperature.

Mounted in the lever 26 below the fulcrum 27, so that their movement is a multiple of the thermostatic movement of the free end 7a of the heating element, are adjustment screws 30, 31 and 32, the position of which may be adjusted so that their inner ends operate respective micro-switches 33, 34 and 35, when the lever 26 moves the screws inwardly to preselected positions each corresponding to a predetermined length and temperature of the element 7. When the screws move outwardly from their preselected positions in response to cooling and contraction of the element 7, each disengages and permits its respective micro-switch to automatically assume its normal position.

Referring more particularly to Fig. 2, the switches 33 and 35 are two-pole switches which are open when not engaged by their respective screws 30 and 32. The switch 34 is a three-pole switch which, when not engaged by its adjustment screw 31, connects leg $L^1$ of a two-leg power source $L^1$, $L^2$ with an intermediate tap 36 in the primary of the transformer 14. However, when engaged by its operating screw 31 on the lever 26, the switch 34 connects power leg $L^1$ with primary terminal 14c of the transformer 14 through normally closed micro-switch 35. The third primary terminal 14d of the transformer 14 is connected through a normally closed relay switch 37 with the power leg $L^2$.

As shown in Fig. 2, the clamping solenoid 22 is connected in series with the micro-switch 33 and the starting switch 25 across the power line $L^1$, $L^2$. A second and normally open relay switch 38 is connected in parallel with the starter switch 25, and a relay 39 which operates the relay switches 37 and 38 is connected in parallel with the solenoid 22.

The operation of the heat sealer when wired in the manner illustrated in Fig. 2 is as follows: Current is initially supplied to that portion of the primary of the transformer 14 between primary terminal 14d and primary tap 36 through the thermally responsive micro-switch 34 and the normally closed relay switch 37 to rapidly heat the element 7. Upon reaching a temperature preselected by adjustment of the screw 31 on the lever 26 (Fig. 1), the screw 31 operates the switch 34 and breaks the connection to the primary tap 36. Thereupon the switch 34 connects the power leg $L^1$ to the primary terminal 14c through the micro-switch 35 and the heating of the element 7 is continued at a lesser rate to the sealing temperature selected by adjustment of the screw 32. Thereafter the selected sealing temperature will be maintained by a make and break action of the micro-switch 35 responsive to heating and cooling of the element 7 at the desired temperature.

Thermoplastic film is now, or may previously have been inserted between the open jaws 1 and 2 (Fig. 1) and the space bar 24 is depressed so as to close the switch 25 and energize the clamping solenoid 22, thereby clamping the film between the jaws 1 and 2. Simultaneously, relay 39 is energized and opens relay switch 37, thereby breaking the circuit from the power line $L^1$, $L^2$ through the primary of the transformer 14 and discontinuing the heating of the element 7. Concurrently, relay 39 closes the relay switch 38 which shunts the manually operable switch 25 and assures continued energization of the solenoid 22 to maintain clamping pressure between the jaws 1 and 2, even though the switch 25 opens, until the element 7 is cooled to a temperature selected by adjustment of the screw 30 at which the micro-switch 33 opens. Thereupon, the solenoid 22 and relay 39 are deenergized. The clamping jaws 1 and 2 open and release the sealed film while the relay switches 37 and 38 resume their normally closed and open positions respectively and heating of the element 7 is automatically repeated in the manner heretofore described preparatory to a subsequent sealing operation.

It will be understood that the element 7 may be allowed to cool naturally when the relay switch 37 is open. However, forced cooling is preferred and in the embodiment illustrated in Fig. 2, the upward movement of the solenoid armature 22a which occurs upon energization of the solenoid 22 and which closes the clamping jaws 1 and 2 (Fig. 1) also opens a suitable valve (not shown) which supplies fluid coolant to the element 7 through line 15. Downward movement of the armature 22a which occurs upon deenergization of the solenoid 22 closes the valve and the coolant drains from the element 7 through the exhaust line 16 so that the element may be rapidly heated.

When desired or, for example, in the case of films which are preferably heated to fusion temperature without appreciably exceeding that temperature, and particularly in the case of relatively thick films and films which cannot be heated appreciably above their fusion temperature without deteriorating, it is desirable to delay the forced cooling so that the necessary heat for fusion can be supplied at a relatively low temperature. This may be accomplished by modifying the circuit, as shown in dotted lines in Fig. 2, and controlling the forced cooling by a second solenoid 40 rather than by the clamping solenoid 22. The solenoid 40 is provided with a suitable time delay unit 41 and is connected in parallel with the relay 39 and the clamping solenoid 22. With this arrangement, energization of the solenoid 40 and forced cooling of the element 7 may be initiated subsequent to energization of the solenoid 22 and only after a suitable time delay following the clamping of the film between the jaws 1 and 2.

If desirable, the relay switch 37 may be made responsive to the solenoid 40 rather than the relay 39 so that the heating element 7 is maintained at the temperature selected by adjustment of the micro-switch adjustment 32 during the time delay between the clamping of the jaws and the subsequent forced cooling of the element 7.

Fig. 3 shows a further modification of the control circuit in which the coolant control solenoid 40 is connected between the micro-switch 34 and the relay switch 38 and an additional relay switch 41 is located in the line between the primary tap 36 and the switch 34.

The operation effected by the circuit illustrated in Fig. 3 generally is like that effected by the circuit shown in Fig. 2. While the clamping jaws 1 and 2 are open, the heating element 7 is energized at a rapid rate to a preselected temperature through the thermostatically controlled micro-switch 34 and the normally closed relay switch 41 and thereafter is maintained a little above that temperature at a slower heating rate through micro-switch 35.

The thermoplastic film to be sealed is now placed between the clamping jaws 1 and 2, which are closed by the solenoid 22, when the latter is energized by the closing of the manually operative switch 25. Closing of the switch 25 also energizes the relay 39 which opens the normally closed switches 37 and 41 and closes the normally open relay switch 38. Opening of the switch 37 deenergizes the heating element 7 while opening of the relay switch 41 prevents current passing through the upper primary winding of the transformer 14 to energize the solenoid 40 prematurely.

When the temperature of the heating element 7 has fallen enough to disengage the adjustment screw 31 from its micro-switch 34, the latter automatically moves from the dotted to the solid line position shown in Fig. 3 and the solenoid 40 is energized. Thereupon cooling liquid is shot through the line 15 into the heating element 7 and cooling is rapidly completed. When the heating element 7 cools to the low temperature preselected by adjustment of the screw 30 (Fig. 1) at which the film is sufficiently cooled to be set, the micro-switch 33 opens breaking the hold of the clamping solenoid 22 and deenergizing the solenoid 40 thereby discontinuing the flow of coolant through the element 7.

The temperature preselected by adjustment of screw 32 is one at which heat from the element 7 raises the film to fusing temperature without heating the film nearest the element 7 to a point at which it deteriorates.

Where successive sealing operations are being made and heat economy as well as rapidity is desired, heating of the element 7 preferably is initiated at a time such that the element 7 attains the sealing temperature selected by adjustment of screw 32 simultaneously with the closing of the clamping jaws 1 and 2. Accordingly, if necessary, energization of the heating element may be delayed by a time delay (not shown) rather than initiated immediately upon opening of the jaws 1 and 2.

The temperature of the element 7 obviously may be controlled by other than the preferred means heretofore described so long as the element supplies sufficient heat to the film so that the contacting surfaces attain bonding temperature before they are cooled by the element and without deteriorating the film.

The flow of current is stopped when the necessary amount of heat is available in the element and forced cooling may be commenced before the seal is completely heated so long as the element subsequently supplies the necessary heat to the seal before the heat transfer is reversed and the element removes the heat from the seal.

The heat sealer schematically illustrated in Fig. 4 includes a heating element 7' of low heat capacity which which is force cooled by contact with a cooling member 42 of relatively unlimited capacity. A clamping bar or jaw 43 is adapted initially to press two or more layers 44 of film against the element 7' and thereafter force the latter into cooling engagement with the cooling member 42. Preferably the member 42 is itself internally cooled by a flow of coolant.

The element 7' may be electrically heated and its temperature thermostatically controlled in the same way as the element 7 heretofore described with reference to Figs. 1–3. A source of current and suitable control therefor are indicated merely schematically at 45 and 46. Heating of the element 7' is discontinued when the clamping jaw 43 is closed or at a preselected time period thereafter by a switch 47 which breaks the heating circuit.

A principal advantage of the sealer schematically shown in Fig. 4 is that the heating element is rapidly force-cooled uniformly throughout its entire length by engagement and conduction of its heat to the cool member 42 of relatively unlimited heat capacity without any of the problems of vaporization and non-uniform cooling which are inherent in internal cooling of a heating element with liquid, such as water.

Furthermore, the member 42 supports the clamping load placed on the element 7' by the jaw 43 and permits the use of a smaller mass and lower heat capacity element than would be possible without danger of failure if the element alone had to withstand the necessary clamping force of the jaw 43. Element 7' may be more rapidly heated and cooled than elements secured to reinforcing members or having sufficient mass to withstand necessary sealing force without support.

Another alternative arrangement is schematically shown in Figs. 5–8, inclusive. A pair of low heat capacity heating elements 48—48 are movable initially into heating contact with opposite sides of the thermoplastic film 44 (Fig. 7). Thereafter, a pair of chilling members 49—49 of greater mass and relatively unlimited heat capacity are moved into engagement with the heating elements 48 (Fig. 8) so as to cool the latter while they are in heat exchanging and sealing relationship with the thermoplastic. Movement of the elements 48 may be effected independently of the members 49 rather than by the latter as in the embodiment of Fig. 4, thereby permitting any desired heating period prior to cooling.

The means for heating and thermostatically controlling the elements 48 are merely schematically illustrated at 45 and 46 (Fig. 5), as are the pivoted arms generally designated 50 and 51, for moving the elements 48 and the cooling and pressing members 49, respectively. The members 48 and 49 of course need not be limited to pivotal movement and may be slidably or otherwise movable in any expedient manner.

If desired, a slotted table may support the film intermediate the open elements 48 (Fig. 6), the seal being made through a slot which provides necessary clearance for the elements 48.

It will be understood that the embodiment of the invention shown in Figs. 5–8 may employ a single pair of independently operable heating and chilling members on one side only of the film 44, as in the embodiment of Fig. 4, rather than the double pair of heating and chilling members on opposite sides of the film.

I claim:

1. The method of heat sealing sheets of thermoplastic material which comprises preheating at least one of cooperating pressure members, discontinuing the heating and thereafter clamping the sheets to be sealed between said members and substantially simultaneously cooling said preheated member to a predetermined temperature below the fusion temperature of the plastic and thereafter unclamping the sheets.

2. The method of sealing sheets of thermoplastic material by heat and pressure applied by a pair of cooperating pressure members, which comprises heating at least a portion of a pressure member to the temperature of fusion of the plastic, thereafter clamping the sheets to be sealed between the members and simultaneously discontinuing the heating of the said member, maintaining the sheets between the clamped members until the temperature thereof falls below the fusion temperature and thereafter unclamping the sheets.

3. The method of rapidly and uniformly heat sealing thermoplastic sheets by applying heat and pressure to each set of sheets to be sealed in a cycle comprising heating a portion of the heat and pressure applying means to a predetermined temperature, thereafter clamping the sheets in the pressure applying means and substantially and simultaneously discontinuing the application of heat to said means, force cooling the clamped sheets at a predetermined rate and to a predetermined temperature, and unclamping the sheets at a time said last named predetermined temperature is reached.

4. Method of heat sealing sheets of thermoplastic material which comprises clamping the sheets between members, at least one of which is of low heat capacity and has been preheated to at least the fusion temperature of the thermoplastic before the clamping, discontinuing the heating of said member substantially simultaneously with the clamping of the sheets, rapidly dissipating the heat of the member while the sheets are clamped, and unclamping the sheets when the temperature thereof is below their fusion temperature.

5. The method of heat sealing thermoplastic sheets by clamping the sheets between heating, pressure and cooling means which comprises heating the sheets in a localized area through contact with heated means of low heat capacity and high temperature, thereafter applying pressure to the sheets in the said area, and cooling the heated means and sheets below their fusion temperature by moving into engagement with the heating means a heat conducting member of relatively great mass and low temperature, and thereafter unclamping the sheets and moving said member out of engagement with the heating means.

6. The method of heat sealing thermoplastic bodies which comprises heating and pressing localized areas of the bodies by a heating member to fuse the plastic of such area and immediately reversing the transfer of heating between the member and the bodies by moving a cooling member of relatively great mass and heat capacity into contact with the heating member while maintaining the pressure on said area.

7. A machine for heat sealing layers of thermoplastic material including cooperating pressure members movable relative to each other into and out of pressing engagement relative to said layers, a heating element for raising the film to sealing temperature, means for heating said element, means for automatically initiating heating of the element prior to movement of said members into pressing engagement with the plastic material, means for moving said members into and out of said pressing engagement, and thermostatic means for automatically discontinuing heating of said materials by said element prior to movement of said members out of pressing engagement, and wherein said element is intermediate said layers and one of said pressure members and is movable into and out of cooling engagement with said one of said pressure members.

8. A machine for heat sealing layers of thermoplastic material including cooperating clamping members movable relatively to each other into and out of clamping position relative to said layers, a heating element for raising the film to sealing temperature, means for heating said element, means for automatically initiating heating of the element prior to movement of said members to clamp the plastic material, means for moving said members into and out of said pressing engagement, and means for automatically cooling said element prior to movement of said members out of clamping position, and wherein said element has a low heat capacity and one of said clamping members has a high heat capacity, and wherein said cooling of the element is effected by relatively moving the element into heat transferring engagement with said high capacity member.

9. A machine for heat sealing layers of thermoplastic material including cooperating clamping members relatively movable into and out of pressing engagement with said layers, an electric heating element for heating film to sealing temperature, means including a closed relay switch connecting the element to a source of electric power prior to movement of said members into pressing engagement with the plastic material, a relay which when energized opens said relay switch, a solenoid for moving said members into and out of said pressing engagement, a switch for connecting said relay and solenoid to the source of electric power, a second normally open switch which is closed by the energized relay and maintains connection of the solenoid and relay with the power source, thermally responsive means for maintaining the energized heating element approximately at a preselected temperature and for deenergizing the solenoid and relay at a lower temperature.

10. Apparatus as recited in claim 9 and including time delay means for postponing energization of said relay for a predetermined time following energization of said solenoid.

11. Apparatus as recited in claim 9 and including operable means for removing heat from said element, a time delay unit and a second solenoid for operating the means for removing heat from said element, said second solenoid and said relay being energized by said time delay unit at a predetermined time following energization of said first solenoid.

12. A heat sealer for thermoplastic film including a low heat capacity heating element relatively movable into heating relationship with said film, and a clamping member for applying pressure to said film through said element, said clamping member having a high heat capacity and being relatively movable into and out of heat exchanging engagement with said element.

References Cited in the file of this patent

UNITED STATES PATENTS

| | | |
|---|---|---|
| 2,382,963 | Dodge | Aug. 21, 1945 |
| 2,469,972 | Lowry | May 10, 1949 |
| 2,481,602 | Lindh | Sept. 13, 1949 |
| 2,509,439 | Langer | May 30, 1950 |
| 2,621,704 | Langer | Dec. 16, 1952 |
| 2,719,567 | Gardner | Oct. 4, 1955 |